(12) United States Patent
Bella et al.

(10) Patent No.: US 9,921,420 B2
(45) Date of Patent: Mar. 20, 2018

(54) EYEGLASSES AND EYEGLASS ATTACHMENT FOR DIRECTING FILTERED AIR OVER THE EYES OF A WEARER

(71) Applicants: Paul D. Bella, Commack, NY (US); Matthew S. Campisi, Commack, NY (US)

(72) Inventors: Paul D. Bella, Commack, NY (US); Matthew S. Campisi, Commack, NY (US)

( * ) Notice: Subject to any disclaimer, the term of this patent is extended or adjusted under 35 U.S.C. 154(b) by 0 days.

(21) Appl. No.: 15/273,982

(22) Filed: Sep. 23, 2016

(65) Prior Publication Data

US 2017/0090218 A1    Mar. 30, 2017

Related U.S. Application Data

(60) Provisional application No. 62/232,533, filed on Sep. 25, 2015.

(51) Int. Cl.
  *G02C 11/08* (2006.01)
  *G02C 5/02* (2006.01)
  (Continued)

(52) U.S. Cl.
  CPC ............. *G02C 11/08* (2013.01); *G02C 5/02* (2013.01); *G02C 5/08* (2013.01); *G02C 5/146* (2013.01); *G02C 11/10* (2013.01)

(58) Field of Classification Search
  CPC ..................................................... G02C 11/08
  (Continued)

(56) References Cited

U.S. PATENT DOCUMENTS

| 6,233,342 B1 | 5/2001 | Fernandez ...................... 381/62 |
| 6,550,914 B1 | 4/2003 | Kopfer ........................... 351/62 |

(Continued)

FOREIGN PATENT DOCUMENTS

| JP | 2010 243704 | 10/2010 | ............. G02C 11/00 |
| WO | WO 93/22702 | 11/1993 | ............... A61F 9/00 |

OTHER PUBLICATIONS

The Notification of Transmittal of the International Search Report and Written Opinion of the International Searching Authority, or the Declaration, dated Dec. 15, 2016, which was issued by the International Bureau of WIPO in Applicants' corresponding international PCT application having Serial No. PCT/US16/53296, filed on Sep. 23, 2016.

(Continued)

*Primary Examiner* — Hung Dang
(74) *Attorney, Agent, or Firm* — Bodner & O'Rourke, LLP; Gerald T. Bodner; Christian P. Bodner (57) ABSTRACT

A pair of eyeglasses includes a lens support structure having an elongated cavity formed therein that defines an air plenum extending transversely across the lens support structure. Air blowers are situated at opposite axial ends of the lens support structure and generate pressurized air into the elongated cavity. A HEPA filter is situated within the elongated cavity. A plurality of orifices formed in a bottom surface of the lens support structure directs pressurized air from the elongated cavity into the space between the eyeglass lens and the eyes of a user to displace allergens. Electronic circuitry, including a battery and switch, is situated within the lens support structure and operates the blowers. A status indicator is situated on the lens support structure to provide a visual indication of the operational state of the blowers and condition of the battery.

20 Claims, 5 Drawing Sheets

(51) Int. Cl.
   *G02C 5/08*    (2006.01)
   *G02C 5/14*    (2006.01)
   *G02C 11/00*   (2006.01)
(58) Field of Classification Search
   USPC .............................................. 351/62; 2/435
   See application file for complete search history.

(56) References Cited

U.S. PATENT DOCUMENTS

| | | | |
|---|---|---|---|
| 2003/0035082 A1* | 2/2003 | Olney | G02C 11/08 |
| | | | 351/62 |
| 2006/0055878 A1 | 3/2006 | Yee | 351/159.02 |
| 2015/0116652 A1 | 4/2015 | Bidinot | 351/62 |

OTHER PUBLICATIONS

The Written Opinion of the International Searching Authority, in English, dated Dec. 15, 2016, which was issued by the International Bureau of WIPO in Applicants' corresponding international PCT application having Serial No. PCT/US16/53296, filed on Sep. 23, 2016.

The International Search Report, dated Dec. 15, 2016, which was issued by the International Bureau of WIPO in Applicants' corresponding international PCT application having Serial No. PCT/US16/53296, filed on Sep. 23, 2016.

* cited by examiner

EYEGLASSES AND EYEGLASS ATTACHMENT FOR DIRECTING FILTERED AIR OVER THE EYES OF A WEARER

CROSS-REFERENCE TO RELATED APPLICATIONS

This application is related to U.S. Provisional Patent Application Ser. No. 62/232,533, filed on Sep. 25, 2015, and entitled "Eyeglasses And Eyeglass Attachment For Directing Filtered Air Over The Eyes Of A Wearer", the disclosure of which is hereby incorporated by reference and on which priority is hereby claimed.

BACKGROUND OF THE INVENTION

Field of the Invention

The present invention relates to eyeglasses and attachments for eyeglasses.

Description of the Related Art

It is well documented that eyes are one of the most sensitive and vulnerable organs due to their unprotected exposure to the environment. Ocular allergies, or allergies in the eye, are no different than allergies that affect your sinuses, nose or lungs. Additionally, allergy eyes can generate other problems, such as conjunctivitis (AKA pink eye) and asthma. A condition known as rhino conjunctivitis occurs when both nasal and eye allergies occur simultaneously.

About 30%-50% of all U.S. residents have some type of allergy symptom, and about 75% of those symptoms affect the eyes. Eye allergies happen when airborne allergens and other particles (i.e., dust) land directly on the surface of your eye, causing irritation and redness. Then, the body overreacts to the substance and floods the eyes with tears and mucus. Most people will experience itchy eyes. It is the most common symptom of allergy eyes. It can affect both of your eyes or sometimes, one eye may be more intensely affected than the other.

When an allergen comes into contact with your eyes, your body releases histamines—a chemical produced in reaction to a substance that the immune system cannot tolerate. Special cells called mast cells make histamines. These cells are present throughout the body, but are highly concentrated in the eyes. This leads to itching, redness, and watery eyes.

The American College of Allergy, Asthma and Immunology estimates that 50 million people in the United States have seasonal allergies, and its prevalence is increasing—affecting up to 30 percent of adults and up to 40 percent of children. In addition to having symptoms of sneezing, congestion and a runny nose, most of these allergy sufferers also experience itchy eyes, watery eyes, red eyes and swollen eyelids.

Normally harmless substances that cause problems for individuals who are predisposed to allergic reactions are called allergens. The most common airborne allergens that cause eye allergies are pollen, mold, dust and pet dander.

Among widely known preventative measures to reduce itchy, burning, watery eyes are: 1) to stay indoors & keep the windows closed or 2) wear sunglasses to help shield your eyes.

OBJECTS AND SUMMARY OF THE INVENTION

It is an object of the present invention to provide modified eyeglasses which are designed to minimize the amount of pollen, dust and other allergens from coming in contact with the eyes of a wearer of the eyeglasses.

It is another object of the present invention to provide an attachment to conventional eyeglasses which also is designed to minimize the amount of pollen; dust and other allergens from coming in contact with the wearer's eyes when the attachment is mounted on the eyeglasses.

It is still another object of the present invention to provide eyeglasses and attachment for existing eyeglasses which provide filtered air to the eyes of the wearer of the eyeglasses.

It is a further object of the present invention to provide eyeglasses and attachments for existing eyeglasses which are lightweight and comfortable for a user to wear.

It is yet a further object of the present invention to provide an attachment for conventional eyeglasses that provides filtered air to the eyes of a user of the eyeglasses on which the attachment is mounted and which attachment is adjustable in width and angle so as to conform to the shape of the eyeglasses on which it is mounted.

In accordance with one foil of the present invention, eyeglasses are provided which are designed to minimize the amount of pollen, dust and other allergens from coming in contact with the eyes by blowing filtered air toward the nose and mouth to thereby displace the non-filtered air. The eyeglasses include a lens support structure and two ear pieces pivotally attached to opposite lateral sides of the lens support structure. The lens support structure includes an internal cavity which defines an air plenum. A blower or fan draws air through an HEPA filter and into the air plenum. The lens support structure of the eyeglasses includes a bottom wall having a plurality of spaced apart orifices formed therein and which are in communication with the air plenum. The bottom wall is preferably sloped to direct air exiting the orifices formed therein towards the eyes of the wearer of the eyeglasses. Accordingly, air blown by the fan, or fans, through the HEPA filter and into the air plenum of the lens support structure and out of the orifices flood the air space between the eyeglass lenses and the eye surface (i.e., cornea) with filtered air to minimize any contact between allergens and the wearer's eyes.

In yet another form of the present invention, an attachment which blows filtered air in front of the eyes of a user is mountable on an existing, conventional pair of eyeglasses.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

The present invention relates to modified eyeglasses 2 and an attachment 4 for existing eyeglasses 6 designed to minimize the amount of pollen, dust and other allergens from coming in contact with the wearer's eyes by blowing filtered air toward the wearer's nose and mouth, thereby displacing the non-filtered air. This invention addresses the problem by limiting the contact between the surface (i.e., cornea) of the eye and the previously described allergens by flooding the air space between spectacles and the eye with filtered air. It is not the intention to completely remove all such allergens, but instead to reduce their presence in the air contacting the eyes.

Reference should be initially had to FIGS. 1-4 of the drawings, which show eyeglasses 2 for directing filtered air over the eyes of a wearer constructed in accordance with a first form of the present invention. The eyeglasses 2 include the lenses 8, a lens support structure 10 on which the lenses 8 are mounted and which form the frame for holding the lenses 8 in place, and two ear pieces 12 that extend from the lens support structure 10 back over the ears. The two ear pieces 12 are pivotally or hingedly mounted to opposite lateral sides of the lens support structure 10. The lens support structure 10 defines an internal elongated cavity extending transversely thereacross that serves as an air plenum 14. In the embodiment shown in FIGS. 1-4 of the drawings, the lens support structure 10 includes an upper cross member 16 in which the internal elongated cavity, serving as the air plenum 14, is formed, although it is envisioned to be within the scope of the present invention to have the lens support structure 10 formed to completely surround the lenses 8 of the eyeglasses 2 and the air plenum 14 being formed therewithin also to encircle the eyeglass lenses 8.

Figure 1:
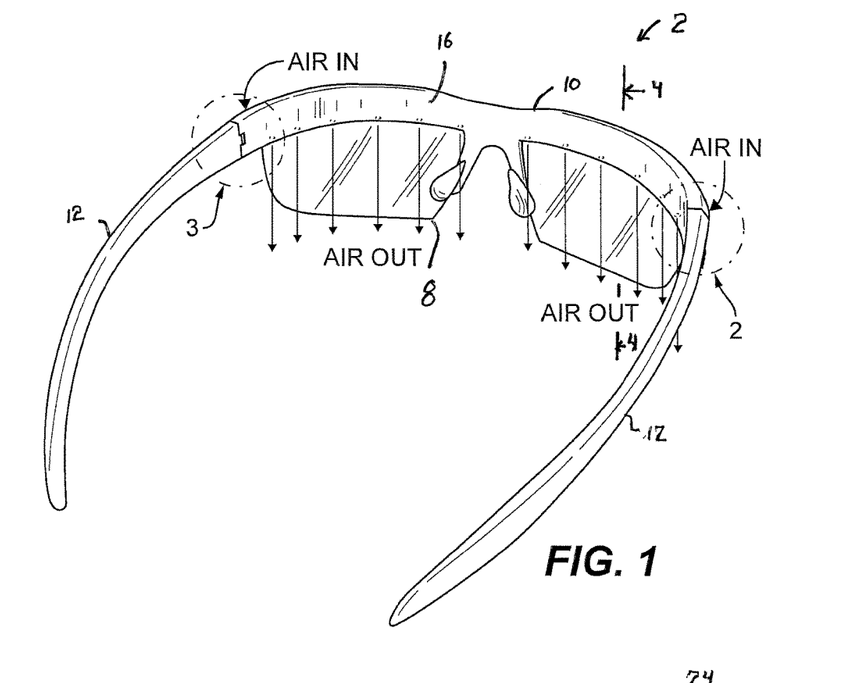
FIG. 1 is a rear perspective view of eyeglasses for directing filtered air over the eyes of a wearer constructed in accordance with a first form of the present invention.

The lens support structure 10 includes circular holes or slots, generally referred to herein as orifices 18, preferably measuring about one millimeter in diameter and equally spaced along the length of the bottom wall of the upper cross member 16 of the lens support structure 10, adjacent orifices 18 being spaced about ten millimeters from each other. The orifices 18 are in fluid communication with the air plenum 14 within the lens support structure 10 to allow air from the air plenum 14 to exit through the orifices 18.

More specifically, the air plenum 14 is designed as a hollow conduit that is pressurized by a pair of micro blowers 20, the blowers 20 being in fluid communication with the air plenum 14 to blow air therethrough. The micro blowers 20 will be described in greater detail. Thus, the holes or orifices 18 formed in the bottom wall of the upper cross member 16 of the lens support structure 10 of the eyeglasses 2 shown in FIGS. 1-4 are arranged to blow air on a single plane parallel to the lenses 8 of the eyeglasses 2. The lens support structure 10 may also be designed to allow air to flow slightly off plane, that is, it is pitched or angled, toward the eye, creating a concave plane bending towards each eye in the center thereof. This may be accomplished with the bottom wall of the upper cross member 16 of the lens support structure 10 being angled or sloped inwardly of the eyes.

As mentioned previously, the eyeglasses 2 of the present invention and shown in FIGS. 1-4 of the drawings include two micro blowers 20. Both micro blowers 20 are incorporated in the air plenum 14, or are at least in fluid communication with the air plenum 14, and provide an air tight seal between the air output or exhaust of the blowers 20 and the air plenum 14, directing the air flow through the circular holes, slots or more generally, orifices 18, described above. Each micro blower 20 is positioned at an opposite lateral edge of the upper cross member 16 of the lens support structure 10, in proximity to where the ear pieces 12 are hingedly mounted to the lens support structure 10. A circular air intake 22 formed as an opening through the thickness of the front wall of the upper cross member 16 of the lens support structure 10 and covered with a mesh or screen is situated in alignment with the air intake of each micro blower 20 so that, when the micro blowers 20 are energized, the blowers 20 will draw air through the screened opening 22 formed in the lens support structure 10 and into the air intake of the blower 20, and force air into the plenum 14 formed in the lens support structure 10 from the blower air exhaust or outlet thereof.

In one form of the present invention, each micro blower 20 is approximately 9 millimeters in height by 9 millimeters in width by 3 millimeters in depth. The micro blowers 20 are preferably DC (direct current) blowers, and may be Part Number UB393-700 manufactured by Sunonwealth Electric Machine Industry Co., Ltd. of Kaohsiung City, Taiwan. Of course, other types of blowers may be suitable for use with the eyeglasses 2 of the present invention, as long as the weight and size thereof are kept at a minimum.

Fitted onto the air intake of each micro blower 20 and in alignment with the screened air inlet 22 is a HEPA filter 24. Alternatively, the HEPA filter 24 may be mounted adjacent the air exhaust of each micro blower 20, or may be positioned within the air plenum 14 and disposed across the transverse cross-sectional area thereof prior to the start of the air orifices 18 so that only filtered air will be blown into the air plenum 14 and out through the orifices 18 toward the eyes, nose and mouth of the user of the eyeglasses 2, as depicted by the arrows in FIGS. 1, 3 and 4 of the drawings.

Figure 2:
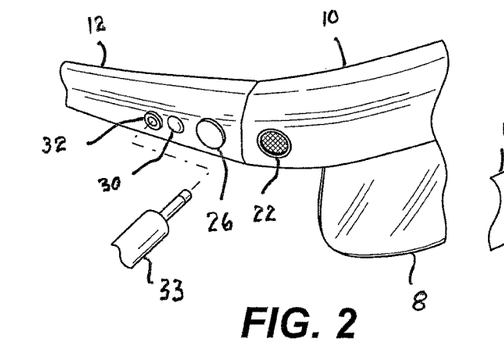
FIG. 2 is an enlarged perspective view of a portion of the eyeglasses of the present invention shown encircled in FIG. 1 by the broken line labeled with the reference number 2.
Figure 3:
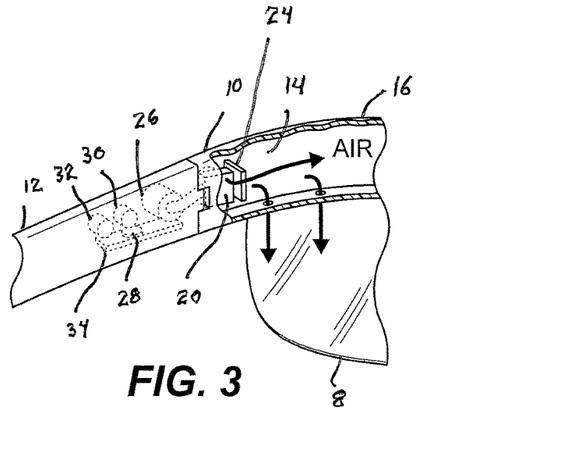
FIG. 3 is an enlarged perspective view of a portion of the eyeglasses of the present invention shown encircled in FIG. 1 by the broken line labeled with the reference number 3.
Figure 4:
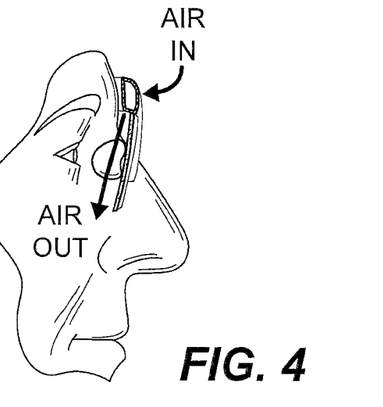
FIG. 4 is a longitudinal cross-sectional view of the eyeglasses of the present invention shown in FIG. 1, taken along line 4-4 of FIG. 1, and illustrating the eyeglasses of the present invention being worn by a user thereof.

As shown in FIGS. 2 and 3 of the drawings, the eyeglasses 2 of the present invention further include an on/off push button switch 26, a battery 28, a light emitting diode (LED) indicator 30 (or some other form of indicator) and a female connector 32. The switch 26, battery 28, LED indicator 30 and connector 32 are preferably mounted on one or both of the ear pieces 12 of the eyeglasses 2 and, in one form, are situated near where the ear pieces 12 are hingedly attached to the lens support structure 10 of the eyeglasses 2.

The switch 26 on each ear piece 12 is provided to energize and de-energize a corresponding micro blower 20, which is attached thereto by wires or other flexible conductors through the hinge attaching the ear piece 12 to the lens support structure 10. The LED indicator 30, mounted on the ear piece 12 to be exposed and viewable to the wearer of the eyeglasses 2, is provided to indicate to the wearer that the blower or blowers 20 are energized. The female connector 32, also mounted on one or both of the ear pieces 12, is provided to accept a male jack 33 of an electrical cable leading to an external charging unit provided for charging the internal battery 28 mounted on a printed circuit board 34 situated within each ear piece 12. The LED indicator 30 will indicate, either by flashing or changing colors, or by being extinguished, whether or not the battery 28 used to power an associated micro blower 20 is charged or discharged (and requires charging).

The battery 28 may be, for example, a non-serviceable, small single cell lithium polymer battery (LiPo, 3.7 volt, approximately 150 milli-ampere-hours). The female connector 32 may be, for example, a mini USB port that is connectable to a compatible USB connector of a five volt charging circuit. The printed circuit board 34 may include other circuitry, such as a DC-to-DC converter circuit for charging the 3.7 volt battery 28.

Thus, the micro blowers 20 are energized by the electronics and, together, pressurize the air plenum 14. The air plenum 14, which as mentioned previously is a conduit within the lens support structure 10 that runs across and above the eyes of the wearer of the eyeglasses 2 (although the plenum 14 may extend through a frame which encircles the lenses 8), provides filtered air through the orifices 18 toward the eyes of the wearer of the eyeglasses 2. In this way, any allergens, pollen or dust in the air space between the user's eyes and the lenses 8 of the eyeglasses 2 will be displaced by filtered air such that contact between the wearer's eyes and allergens, dust and pollen will be minimized.

Although a tactile, on/off push, button switch 26 is described above and positioned on each ear piece 12 of the eyeglasses 2 of the present invention to energize the micro blowers 20, it is envisioned to be within the scope of the present invention to use a flexible hinge switch that is built into each hinge connecting the ear pieces 12 to the lens support structure 10 so that, when the frame is opened with the ear pieces 12 extending substantially from the lens support structure 10, such as more than 45 degrees, the flexible hinge switches automatically energize the blowers 20, but when the user folds the ear pieces 12 against the lens support structure 10 (such that the ear pieces 12 are angled at less than 45 degrees from the lens support structure 10) for storage in an eyeglass case, for example, the flexible hinge switches will automatically de-energize the blowers 20.

Figure 5:
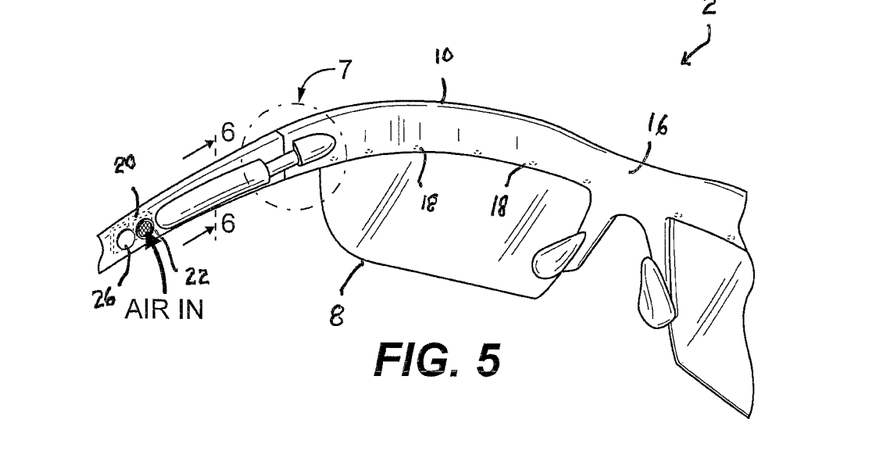
FIG. 5 is a rear perspective view of a portion of eyeglasses for directing filtered air over the eyes of a wearer constructed in accordance with a second form of the present invention.
Figure 6:
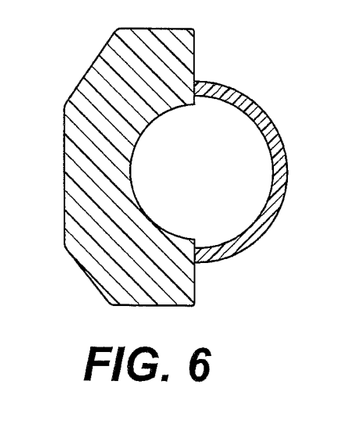
FIG. 6 is a longitudinal cross-sectional view of the eyeglasses of the present invention shown in FIG. 5, taken along line 6-6 of FIG. 5.
Figure 7:
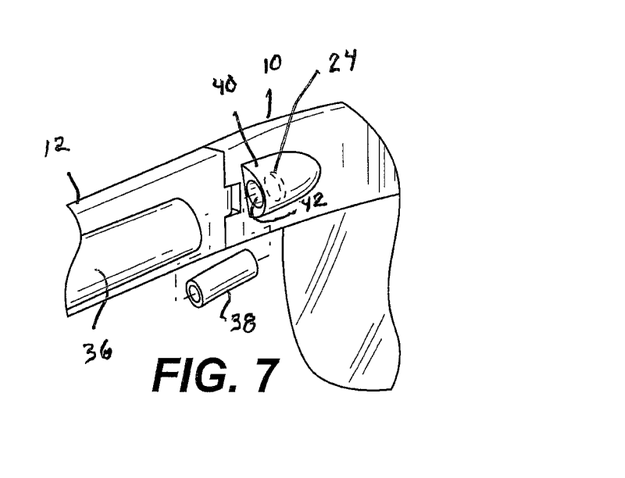
FIG. 7 is a partially exploded, rear perspective view of a portion of eyeglasses for directing filtered air over the eyes of a wearer constructed in accordance with a third form of the present invention.

FIGS. 5-7 show a modification of the eyeglasses 2 of the present invention shown in FIGS. 1-4. In order to maintain a lower profile on the lens support structure 10, the micro blowers 20, with the filters 24 attached thereto, may be relocated from the lens support structure 10 of the eyeglasses 2 to the ear pieces 12. In such an embodiment, each ear piece 12 may include structure 36 defining internally an air channel which is in communication with the outlet of the micro blower 20 and may be in fluid communication with the air plenum 14 of the lens support structure 10 through a flexible conduit 38 that may bend up to 90 degrees, which bridges the hinge between the ear piece 12 and the lens support structure 10. An inlet structure 40, defining an inlet opening 42 that is in communication with the air plenum 14, may be formed on each lateral side of the lens support structure 10 such that the flexible conduit 38 is interposed between the structure 36 on the ear piece 12 which defines the air channel and the air inlet-defining structure 40 on the lens support structure 10.

Figure 8:
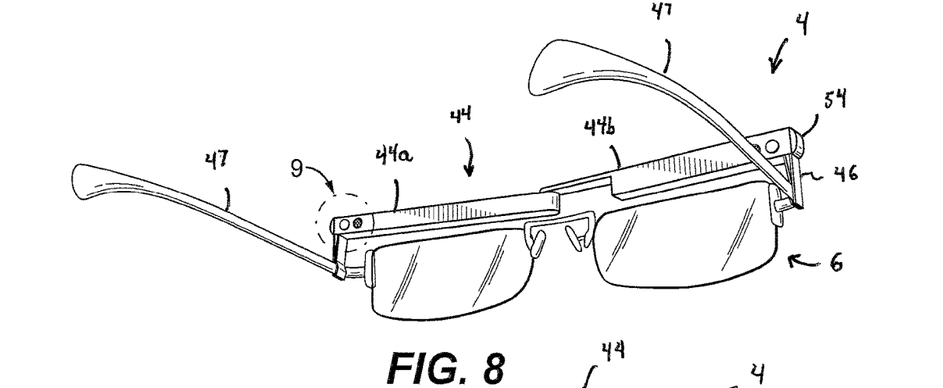
FIG. 8 is a rear perspective view of an eyeglass attachment for directing filtered air over the eyes of a wearer constructed in accordance with a fourth form of the present invention, and illustrating the eyeglass attachment of the present invention mounted on conventional eyeglasses.
Figure 9:
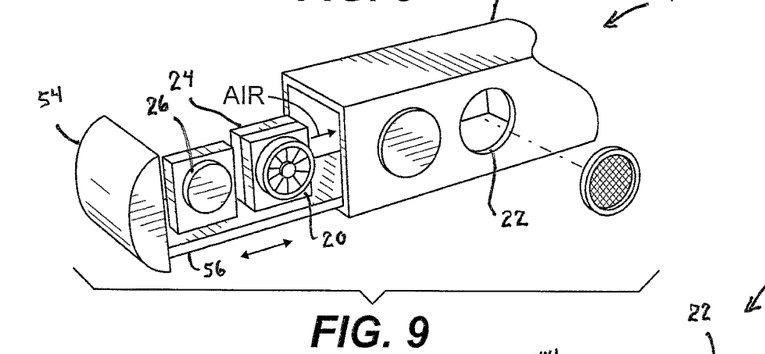
FIG. 9 is an enlarged perspective view of a portion of the eyeglass attachment of the present invention shown in FIG. 8 and encircled by the broken line labeled with the reference number 9, the portion being shown in an open state.
Figure 10:
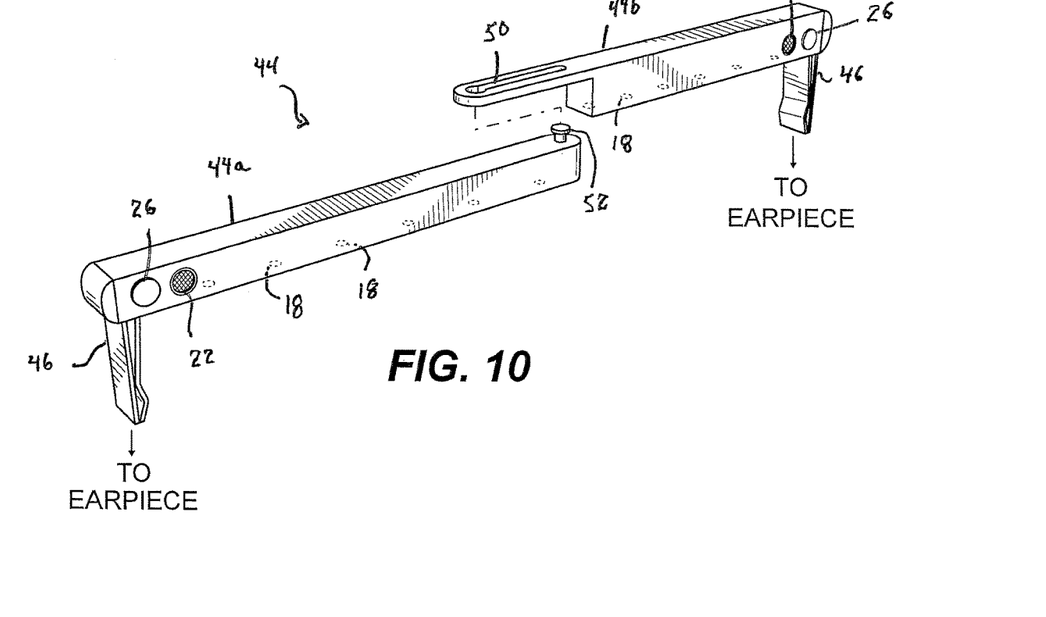
FIG. 10 is a partially exploded, perspective view of the eyeglass attachment of the present invention shown in FIG. 8.

FIGS. 8-10 illustrate another embodiment of the present invention which is in the form of an attachment 4 that may be mounted on existing conventional eyeglasses 6 and used for directing filtered air over the eyes of a wearer.

The attachment 4 may include an elongated member 44, either formed as a single piece or in mating sections, having a hollow body defining an internal cavity that serves as an air plenum 14 therewithin that extends across the top or brim of conventional eyeglasses 6 and which is attachable to the ear pieces 47 thereof. The elongated member 44 preferably includes an air inlet 22 covered by a mesh or screen and an on/off push button switch 26 situated on a wall thereof that is exposed and accessible to the user to energize and de-energize the micro blowers 20. The micro blower, or micro blowers 20, are situated within the hollow body defining the air plenum 14 of the attachment 4 and in alignment with the screened air inlet 22 of the attachment 4. A plurality of orifices 18, spaced apart from each other, are formed in the bottom wall of the attachment 4 so as to direct air blown into the air plenum 14 from the air inlets 22 by the micro blowers 20 towards the eyes of the wearer of the glasses 6 on which the attachment 4 is mounted. A HEPA filter 24, such as mentioned previously, is affixed either to the air inlet of the blower 20 or the air outlet to provide filtered air through the air plenum 14 of the attachment 4 and out of the orifices 18 formed in the bottom wall thereof. Situated at each opposite lateral end of the attachment 4 is a resilient clip 46 fanned of two parallelly extending leaf springs 48 between which a portion of the ear piece 47 of the conventional eyeglasses 6 may be received so as to mount the attachment 4 onto the eyeglasses 6 and in position to direct filtered air between the lenses of the eyeglasses 6 and the wearer's eyes.

In the embodiment shown in FIGS. 8-10, the elongated member 44 of the attachment 4 is formed of two sections 44a, 44b, each defining therewithin an air plenum 14 and having a plurality of orifices 18 formed in the bottom wall thereof. The proximate ends of the two sections 44a, 44b are attachable to each other with a keyhole slot 50 formed in one section 44b and a pin 52 having an enlarged head formed on the other section 44a, with the pin 52 passing through the keyhole slot 50 and being held captive therein. The advantage of this embodiment is that the attachment 4 may be adjustable in overall length and curvature so as to match the width and curvature of a pair of eyeglasses 6 on which the attachment 4 is mounted.

As shown in FIG. 9, each section 44a, 44b of the attachment 4 may include an end cap 54 and drawer 56 mounted thereon which is slideable within the internal cavity defined by each section 44a, 44b of the attachment 4 so as to have access to the electronic components, including the switch 26, blower 20 and filter 24, of the attachment 4.

Figure 11:
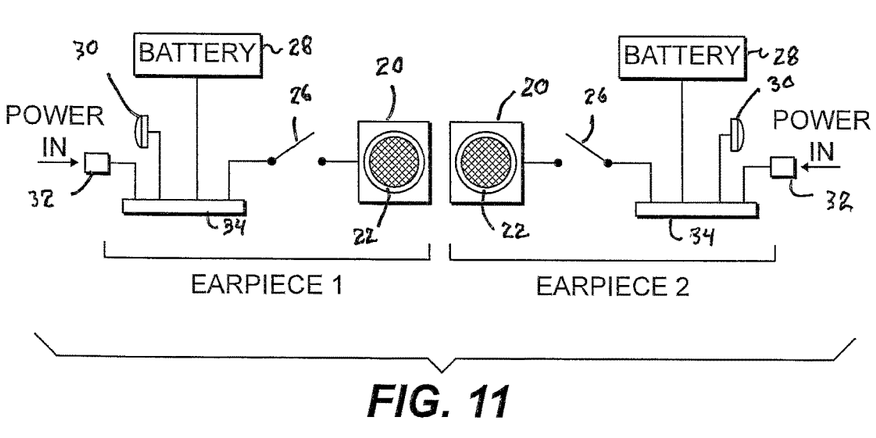
FIG. 11 is a block diagram of electronic circuitry used in the eyeglasses and eyeglass attachment of the present invention shown in FIGS. 1-10.

FIG. 11 illustrates the electronic circuitry of the eyeglasses 2 and eyeglass attachment 4 of the present invention shown in FIGS. 1-10. The circuitry may be provided in duplicate and situated either in each ear piece 12 or at the lateral end portions of the lens support structure 10 of the eyeglasses 2 or eyeglass attachment 4 within the internal cavity thereof. As mentioned previously, each circuit includes a micro blower 20 having a HEPA filter 24 attached thereto, a switch 26, a battery 28, mounted on a printed circuit board 34, an LED indicator 30 and a USB or other type of connector 32 for charging the battery 28.

Figure 12:
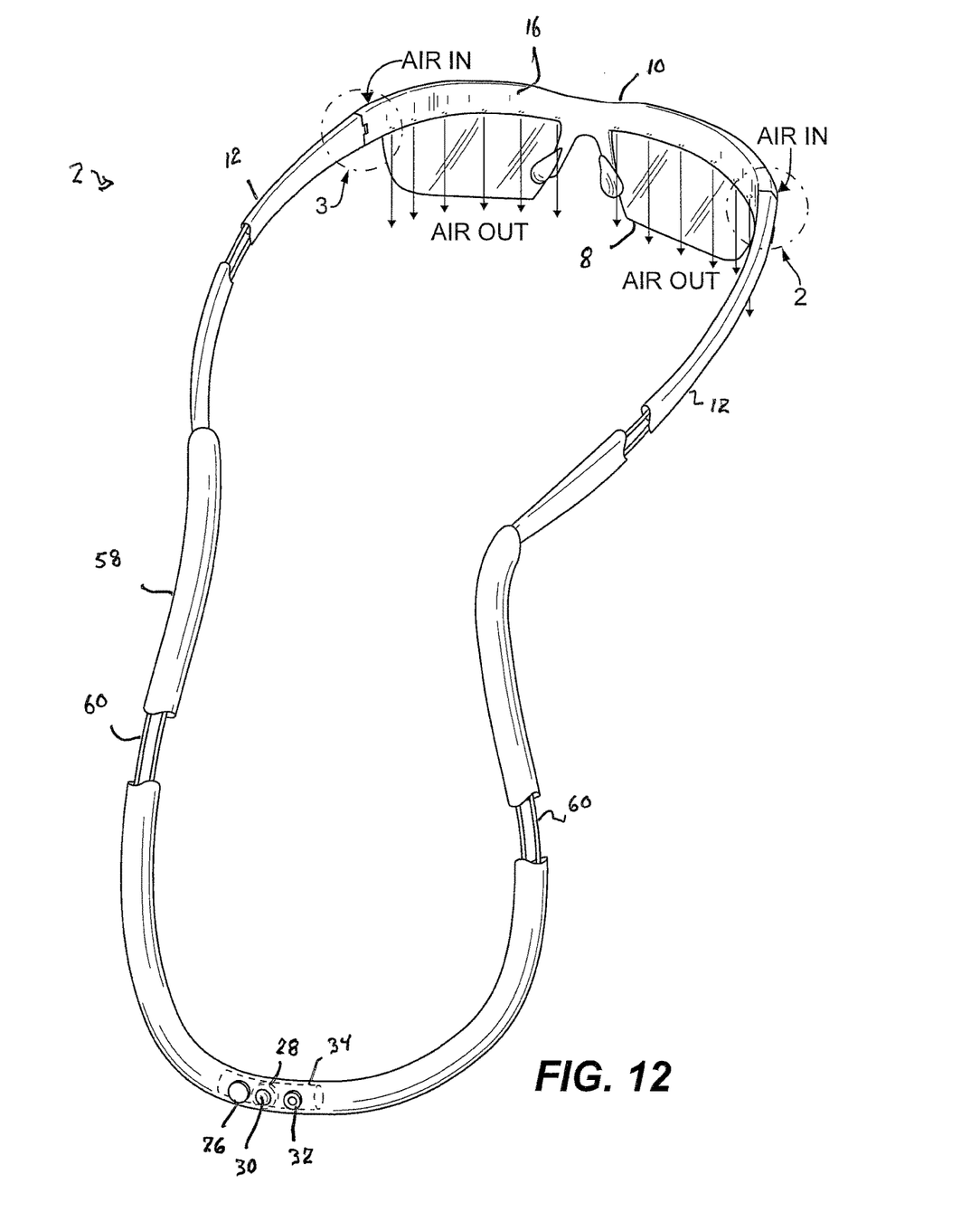
FIG. 12 is a rear perspective view of eyeglasses for directing filtered air over the eyes of a wearer constructed in accordance with a fifth form of the present invention.

FIG. 12 shows yet another form of the eyeglasses 2 of the present invention. Here, to reduce the weight of the eyeglasses 2 even further, the electronic circuitry may be situated in a lanyard 58 attached to both ends of the ear pieces 12. Electrical wires or flexible conductors 60 may pass internally through the outer covering of the lanyard 58 to the micro blowers 20 situated either in the ear pieces 12 near where the ear pieces 12 are hingedly connected to the lens support structure 10, or within the internal cavity defining the air plenum 14 of the lens support structure 10. Thus, the switch 26, LED indicator 30, battery 28 and charging connector 32 may be situated in the lanyard 58, rather than in the ear pieces 12 or the lens support structure 10 of the eyeglasses 2 in order to reduce the overall weight of the eyeglasses 2 and provide greater comfort to the wearer of the eyeglasses 2. Furthermore, and as can be seen from FIG. 12 of the drawings, only one switch 26, one LED indicator 30, one battery 28 and one charging connector 32 are used and provided to control the energization and de-energization of the micro blowers 20 situated within the ear pieces 12 or lens support structure 10 of the eyeglasses 2.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Eyeglasses which comprise:
a lens support structure having a first axial end and a second axial end disposed opposite the first axial end;
at least a first ear piece and a second ear piece, the first ear piece and the second ear piece being extendable generally perpendicularly outwardly from the lens support structure, the first ear piece being situated in proximity to the first axial end of the lens support structure and the second ear piece being situated in proximity to the second axial end of the lens support structure;
at least one lens, the at least lens being mounted on the lens support structure;
the lens support structure having at least one elongated cavity formed thereon, the at least one elongated cavity defining an air plenum extending at least partially between the first axial end and the second axial end of the lens support structure;
at least one blower, the at least one blower having an air inlet and an air outlet, the air outlet of the at least one blower being in fluid communication with the at least one elongated cavity; and
at least one filter medium, the at least one filter medium being in fluid communication with the at least one elongated cavity and one of the air inlet and air outlet of the at least one blower;
wherein the lens support structure further includes a top surface and a bottom surface disposed opposite the top surface, the bottom surface having at least one orifice formed therein, the at least one orifice being in fluid communication with the at least one elongated cavity;
wherein ambient air enters the at least one blower through the air inlet and pressurized air exits the at least one blower through the air outlet;
wherein the at least one filter medium filters air that is pressurized and provided to the at least one elongated cavity;
wherein filtered, pressurized air flows from the at least one elongated cavity through the at least one orifice formed in the bottom surface of the lens support structure;
wherein the at least one blower is situated within the at least one elongated cavity;
and wherein the lens support structure has formed therein at least one air intake opening in fluid communication with the air inlet of the at least one blower.

2. Eyeglasses which comprise:
a lens support structure having a first axial end and a second axial end disposed opposite the first axial end;
at least a first ear piece and a second ear piece, the first ear piece and the second ear piece being extendable generally perpendicularly outwardly from the lens support structure, the first ear piece being situated in proximity to the first axial end of the lens support structure and the second ear piece being situated in proximity to the second axial end of the lens support structure;
at least one lens, the at least lens being mounted on the lens support structure;
the lens support structure having at least one elongated cavity formed thereon, the at least one elongated cavity defining an air plenum extending at least partially between the first axial end and the second axial end of the lens support structure;
at least one blower, the at least one blower having an air inlet and an air outlet, the air outlet of the at least one blower being in fluid communication with the at least one elongated cavity; and
at least one filter medium, the at least one filter medium being in fluid communication with the at least one elongated cavity and one of the air inlet and air outlet of the at least one blower;
wherein the lens support structure further includes a top surface and a bottom surface disposed opposite the top surface, the bottom surface having at least one orifice formed therein, the at least one orifice being in fluid communication with the at least one elongated cavity;
wherein ambient air enters the at least one blower through the air inlet and pressurized air exits the at least one blower through the air outlet;
wherein the at least one filter medium filters air that is pressurized and provided to the at least one elongated cavity;
wherein filtered, pressurized air flows from the at least one elongated cavity through the at least one orifice formed in the bottom surface of the lens support structure;
wherein at least one of the first ear piece and the second ear piece defines an air channel, the air channel of the at least one ear piece being in fluid communication with the at least one elongated cavity of the lens support structure;
wherein the at least one blower is situated on at least one of the first ear piece and the second ear piece which defines the air channel;
and wherein the air outlet of the at least one blower is in fluid communication with the air channel of the at least one of the first ear piece and the second ear piece.

3. Eyeglasses as defined by claim 2, wherein each of the first ear piece and the second ear piece includes a first axial end and a second axial end disposed opposite the first axial end;

wherein the first axial end of the first ear piece is hingedly connected to the lens support structure in proximity to the first axial end thereof and the first axial end of the second ear piece is hingedly connected to the lens support structure in proximity to the second axial end thereof;

and wherein the eyeglasses further includes a flexible conduit interposed between the air channel of at least one of the first ear piece and the second ear piece and the at least one elongated cavity of the lens support structure and situated in proximity to where at least one of the first ear piece and the second ear piece is hingedly connected to the lens support structure, the conduit being in fluid communication with the air channel and the at least one elongated cavity so that the pressurized air flowing from the air outlet of the at least one blower flows from the air channel through the conduit and into the at least one elongated cavity of the lens support structure.

4. Eyeglasses, which comprise:

a lens support structure having a first axial end and a second axial end disposed opposite the first axial end;

at least a first ear piece and a second ear piece, the first ear piece and the second ear piece being extendable generally perpendicularly outwardly from the lens support structure, the first ear piece being situated in proximity to the first axial end of the lens support structure and the second ear piece being situated in proximity to the second axial end of the lens support structure;

at least one lens, the at least lens being mounted on the lens support structure;

the lens support structure having at least one elongated cavity formed thereon, the at least one elongated cavity defining an air plenum extending at least partially between the first axial end and the second axial end of the lens support structure;

at least one blower, the at least one blower having an air inlet and an air outlet, the air outlet of the at least one blower being in fluid communication with the at least one elongated cavity; and at least one filter medium, the at least one filter medium being in fluid communication with the at least one elongated cavity and one of the air inlet and air outlet of the at least one blower;

wherein the lens support structure further includes a top surface and a bottom surface disposed opposite the top surface, the bottom surface having at least one orifice formed therein, the at least one orifice being in fluid communication with the at least one elongated cavity;

wherein ambient air enters the at least one blower through the air inlet and pressurized air exits the at least one blower through the air outlet;

wherein the at least one filter medium filters air that is pressurized and provided to the at least one elongated cavity;

wherein filtered, pressurized air flows from the at least one elongated cavity through the at least one orifice formed in the bottom surface of the lens support structure;

and wherein the eyeglasses further comprise electronic circuitry for controlling the flow of filtered, pressurized air into the at least one elongated cavity of the lens support structure, at least a portion of the electronic circuitry being situated on at least one of the lens support structure and at least one of the first ear piece and the second ear piece.

5. Eyeglasses as defined by claim 4, wherein the electronic circuitry includes at least one battery, the at least one battery being in electrical communication with the at least one blower, at least one switch, the at least one switch being mounted on at least one of the lens support structure and at least one of the first ear piece and the second ear piece so as to be accessible to a user of the eyeglasses, the switch being operatively coupled to the at least one blower and being selectively changeable by the user to at least a first state, wherein the at least one blower is energized and blows filtered, pressurized air through the at least one orifice of the lens support structure, and a second state, wherein the at least one blower is not energized and does not blow filtered, pressurized air through the at least one orifice of the lens support structure.

6. Eyeglasses as defined by claim 5, wherein the electronic circuitry further includes at least one status indicator, the at least one status indicator being in electrical communication with at least one of the at least one battery, the at least one switch and the at least one blower, wherein the at least one status indicator is situated on the eyeglasses so as to be viewable by the user, the at least one status indicator selectively illuminating to indicate at least one of a first state, wherein the at least one blower is energized, a second state, wherein the at least one battery is not energized, and a third state, wherein the at least one battery requires charging.

7. Eyeglasses as defined by claim 5, wherein the electronic circuitry further includes at least one charging connector, the at least one charging connector being situated on the eyeglasses and being in electrical communication with the at least one battery, the at least one charging connector being electrically connectable with an external power supply that provides power to charge the at least one battery.

8. Eyeglasses as defined by claim 4, which further comprise a lanyard, the lanyard having opposite axial ends which are connectable to the first ear piece and the second ear piece, at least a portion of the electronic circuitry being situated on the lanyard.

9. An attachment for eyeglasses, the eyeglasses including a frame, at least one lens mounted to the frame, the frame having a front surface and back surface situated opposite the front surface and two ear pieces extendable generally perpendicularly outwardly from the frame, the attachment comprising:

an elongated main body having a first axial end and a second axial end disposed opposite the first axial end, the elongated main body being mountable on the eyeglasses;

the main body of the attachment having at least one elongated cavity formed thereon, the at least one elongated cavity defining an air plenum extending at least partially between the first axial end and the second axial end of the elongated main body;

at least one blower situated on the elongated main body, the at least one blower having an air inlet and an air outlet, the air outlet of the at least one blower being in fluid communication with the at least one elongated cavity; and at least one filter medium, the at least one filter medium being in fluid communication with the at least one elongated cavity and one of the air inlet and air outlet of the at least one blower;

wherein the main body of the attachment includes a top surface and a bottom surface disposed opposite the top surface, the bottom surface having at least one orifice formed therein, the at least one orifice being in fluid communication with the at least one elongated cavity;

wherein ambient air enters the at least one blower through the air inlet and pressurized air exits the at least one blower through the air outlet into the at least one elongated cavity;

wherein the at least one filter medium filters air that is pressurized and provided to the at least one elongated cavity;

and wherein filtered, pressurized air flows from the at least one elongated cavity through the at least one orifice formed in the bottom surface of the elongated main body of the attachment.

10. An attachment for eyeglasses as defined by claim 9, wherein the at least one blower is situated within the at least one elongated cavity;

and wherein the elongated main body has formed therein at least one air intake opening in fluid communication with the air inlet of the at least one blower.

11. An attachment for eyeglasses as defined by claim 9, which further comprises:

a first resilient clip situated at the first axial end of the elongated main body; and a second resilient clip situated at the second axial end of the elongated main body;

and wherein the first resilient clip and the second resilient clip are engageable with the frame of the eyeglasses to mount the attachment to the eyeglasses.

12. An attachment for eyeglasses as defined by claim 11, wherein each of the first resilient clip and the second resilient clip includes two parallelly extending leaf springs, the leaf springs defining a space therebetween for receiving a respective ear piece of the eyeglasses so as to removably mount the attachment to the eyeglasses.

13. An attachment for eyeglasses as defined by claim 9, wherein the elongated main body comprises a first mating section and a second mating section, wherein the first mating section and the second mating section are engageable with one another to form the elongated main body.

14. An attachment for eyeglasses as defined by claim 13, wherein the first mating section and the second mating section are positionable relative to each other so as to adjust the overall length of the elongated main body and to allow the attachment to be mounted to eyeglasses of varying widths.

15. An attachment for eyeglasses as defined by claim 14, wherein at least one of the first mating section and the second mating section is formed with a slot, and the other of the first mating section and the second mating section is formed with a pin which is receivable in the slot, the pin and the slot of the first mating section and the second mating section allowing the overall length of the elongated main body to be adjusted.

16. An attachment for eyeglasses as defined by claim 9, which further comprises:

electronic circuitry for controlling the flow of filtered, pressurized air into the at least one elongated cavity of the main body of the attachment, the electronic circuitry being situated on the main body.

17. An attachment for eyeglasses as defined by claim 16, wherein the electronic circuitry includes at least one battery, the at least one battery being in electrical communication with the at least one blower, at least one switch, the at least one switch being mounted on the main body of the attachment so as to be accessible to a user of the attachment, the switch being operatively coupled to the at least one blower and being selectively changeable by the user to at least a first state, wherein the at least one blower is energized and blows filtered, pressurized air through the at least one orifice of the main body of the attachment, and a second state, wherein the at least one blower is not energized and does not blow filtered, pressurized air through the at least one orifice of the main body of the attachment.

18. An attachment for eyeglasses as defined by claim 17, wherein the electronic circuitry further includes at least one status indicator, the at least one status indicator being in electrical communication with at least one of the at least one battery, the at least one switch and the at least one blower, wherein the at least one status indicator is situated on the main body of the attachment so as to be viewable by the user, the at least one status indicator selectively illuminating to indicate at least one of a first state, wherein the at least one blower is energized, a second state, wherein the at least one battery is not energized, and a third state, wherein the at least one battery requires charging.

19. An attachment for eyeglasses as defined by claim 17, wherein the electronic circuitry further includes at least one charging connector, the at least one charging connector being situated on the main body of the attachment and being in electrical communication with the at least one battery, the at least one charging connector being electrically connectable with an external power supply that provides power to charge the at least one battery.

20. An attachment for eyeglasses as defined by claim 17, wherein at least one of the first axial end and the second axial end of the elongated main body of the attachment has formed therein a compartment, the compartment receiving the at least one battery.

* * * * *